United States Patent

Plachenov et al.

[15] 3,704,806

[45] Dec. 5, 1972

[54] DEHUMIDIFYING COMPOSITION AND A METHOD FOR PREPARING THE SAME

[72] Inventors: Tikhon Grigorievich Plachenov, Leningrad; Grigory Markovich Belotserkovsky, Leningrad; Ekaterina Nikolaevna Dolgova, Leningrad; Jury Valentinovich Ezhov, Leningrad; Vladimir Alexandrovich Fogel, Leningrad; Andrei Pavlovich Benediktov, Zelenogorsk; Iliya Yakovlevich Avilov, Leningrad, all of U.S.S.R.

[73] Assignee: Leningradsky Tekhnologichesky Imeni Lensoveta, Leningrad, U.S.S.R.

[22] Filed: Jan. 6, 1971

[21] Appl. No.: 104,480

[52] U.S. Cl. ............. 220/64, 117/95, 117/161 ZB, 252/194, 260/37 EP, 260/38
[51] Int. Cl. ............................................. B65d 25/14
[58] Field of Search ............. 260/37 EP, 38; 252/194; 117/161 ZB, 95; 220/64

[56] References Cited

UNITED STATES PATENTS

| 3,245,946 | 4/1966 | O'Conner et al. | 252/194 X |
| 3,396,140 | 8/1968 | Weller | 260/37 EP |
| 3,420,791 | 1/1969 | Gurgiolo et al. | 260/37 EP X |
| 3,464,854 | 9/1969 | Bolger | 260/37 EP X |
| 3,545,622 | 12/1970 | Sakhnovsky | 252/194 X |

*Primary Examiner*—Edward G. Whitby
*Attorney*—Waters, Roditi, Schwartz & Nissen

[57] ABSTRACT

A dehumidifying composition intended for the dehydration of hermetically sealed containers of various shape and capacity, small-capacity containers inclusive, which contains 20–60 wt. percent of zeolite and 40–80 wt percent of thermosetting polymer. Said polymer may be obtained by curing diverse thermosetting resins such as, for example, epoxide and phenol-formaldehyde resins. The dehumidifier of the invention finds application in the form of a film or coat strongly bonded to the material of the containers being dehydrated and no special means are required for securing it in the containers used in conjunction with diverse semiconductor devices and instruments.

8 Claims, No Drawings

DEHUMIDIFYING COMPOSITION AND A METHOD FOR PREPARING THE SAME

This invention relates to dehumidifiers intended for dehydration of hermetically sealed containers of varied shape and capacity, small-capacity containers inclusive, and to a method for preparing the same. The present invention is primarily concerned with maintaining constant humidity in casings and enclosures for semiconductor devices and integrated circuits in order to provide for parameter stability and performance reliability of said devices and circuits.

The dehumidifying composition, according to the present invention, max likewise find application for desiccating the interior of diverse optical instruments such as, for example, optical tubes.

Silica gel, barium oxide calcium oxide, and zeolites are known dehumidifiers for semiconductor devices, various techniques of disposing and securing said dehumidifying agents in the casings of semiconductor devices being known in the art. Silica gel, barium oxide, calcium oxide, and zeolites are used in conjunction with electronic devices in the form of powders, granules or compressed tablets, the employment of silica gel and zeolites as silicone oil-based fluid or thickened mixtures being also feasible. At present three methods of securing various dehumidifiers in the casings of electronic devices are practiced on an industrial scale. 1. A granular, powdered or tabletted dehumidifier is placed in a special recess provided in the device casing and separated from the casing interior with a fine gauze fabricated from a porous metal such as, for example, nickel. However, this method of dehumidifier employment makes the design of devices excessively elaborate, does not eliminate the possibility of finely pulverulent dehumidifier deposition on the surface of PN junctions, calls for additional steps in the process of electronic device manufacture and also for the use of special-type processing equipment and accessories, effects adversely the productive capacity and increases the cost price. This method is further disadvantageous in that it is inapplicable for introducing and securing a dehumidifying agent in the casings of miniaturized devices.

2. Dehumidifier granules or tablets are secured in the casings of devices with resin-based adhesives. This method is incapable of providing an adequate mechanical strength of dehumidifier bond to the casing, while the thus bonded granules or tablets tend to deteriorate in the course of device operation and evolve fine particles which are likely to "short-circuit" the PN junctions, thereby necessitating the protection of device surfaces with varnish coating which generally impair the performance parameters. The method is highly laborious and provides no reliable means of checking the strength of dehumidifier-to-casing bonding. A further disadvantage of this method is associated with the fact that a wide range of dehumidifier tablet sizes is required for use in conjunction with various types of devices.

3. The third known method consists in employing fluid or thickened mixtures of silicone oils with aerosil or zeolite powders and suffers, like the two previously described methods, from major limitations, such as the employment of special-type processing equipment, a cumbersome procedure required for dehumidifying mixture preparation, and the danger of silicone oil penetration onto the container flanges, the latter limitation being responsible for a high percentage of rejects and for the necessity of monitoring 100 percent of the finished devices for hermetic seal. Moreover, silicone oils of the purity required by the method under consideration are critical, while the employment of silicone oils having inadequate purity results in impairing the performance reliability and parameter stability of the devices. This method is further disadvantageous in that the prepared thickened mixture does not lend itself to regeneration and has a limited shelf life (up to 72 hours) prior to mixture introduction into containers, so that it is impracticable to provide a thickened mixture stock.

It is an object of the present invention to provide a dehumidifier for the dehydration of hermetic containers of various capacity and shape used in diverse devices and instruments which will make it possible to attain high performance reliability and parameter stability of devices and instruments, will lend itself to repeated regeneration, will have an unlimited shelf life, will offer greater application convenience as compared to the known dehumidifying agents, and will be conducive to minimizing the percentage of rejects and the costs of production of devices and instruments that incorporate hermetic casings.

It is another object of the present invention to provide a dehumidifier whose rate of water vapor absorption can be varied depending upon specific requirements, as well as upon the microclimate in industrial premises and the duration of device assembling operations.

These and other objects are accomplished by the provision of a dehumidifying composition for the dehydration of hermetic containers of various shape and capacity, small-capacity containers inclusive. The dehumidifying composition, according to the present invention, consists of from 20 to 60 wt. percent of zeolite and from 40 to 80 wt. percent of a thermosetting polymer capable of forming a cohesive bond with zeolite and an adhesive bond with the material of a hermetic container (casing) to be dehumidified.

Said thermosetting polymer may consist of cured epoxide resin or cured phenol-formaldehyde resin, or a mixture thereof. It is likewise feasible to employ other resins such as, for example, urea-phenol-formaldehyde or methylpolymide resins.

Use can be made of diverse modifications of said dehumidifying composition for example, the preferred dehumidifying composition comprises 40 wt. percent of Type Na zeolite A and 60 wt. percent of cured plasticized epoxide resin containing 18 wt. percent of epoxy groups, the advantages offered by said preferred composition being as follows: a higher efficiency which manifests itself in superior adhesion of the composition in question to metallic surfaces and in enhanced mechanical strength of the resultant coating; the absence of crumbling or dusting phenomena in the applied composition, which property is essential in evaluating the quality of finished devices or instruments.

The present dehumidifying composition is preferably used in the form of a film or coat applied to a part of the interior surface of hermetic containers (casings).

The dehumidifier film or coat is strongly bonded to the material of a container being dehydrated, so that no additional means or operations are required for securing said dehumidifier composition in said container.

The method of obtaining the present dehumidifying composition in the form of a film or coat comprises applying onto the inner surface of containers a suspension containing 100 parts by weight of zeolite having a humidity of 20–23 wt. percent, 45–280 parts by weight of a thermosetting resin, 120 parts by weight of an organic solvent intended for dissolving said resin, 0–45 parts by weight of a suitable plasticizer, and 0–85 parts by weight of a curing agent.

The suspension applied onto the inner surface of a container is maintained in the air at a temperature of from 5° to 80° C in order to remove the bulk of volatile components, followed by subjecting said suspension to heat treatment in vacuo at a residual pressure of not greater than $10^{-1}$ mm Hg and at a temperature of from 150° to 180° C. Said heat treatment removes the last traces of volatile components, brings about binder polymerization and results in the formation of film or coat (layer) depending upon the amount of the suspension used, said film (coat) being characterized by a highly extended porous structure which is adhesively bonded to the coated surface and provides for the requisite kinetics of water vapor adsorption. The porous structure of a dehumidifying composition film is defined by the volume of primary pores in zeolite crystals and by the volume of secondary pores. The volume of secondary pores depends primarily on the dispersity of zeolite crystals and binder (resin) particles, as well as on the nature of the binder used, and the type and density of zeolite crystal and binder particle packing.

The volume of secondary pores in the range of equivalent radii of from 291,000 to 31 A equals 0.044 $cm^3/cm^3$, a significant portion of said volume (0.020 $cm^3/cm^3$) being due to the pores in the equivalent radius range of from 98 to 31 Å.

An essential feature of the present dehumidifying composition is that it provides the possibility of controlling the kinetics of adsorption by varying the proportion of components of stock suspensions, so that the present dehumidifying composition can be used in devices and instruments of various types and sizes, the desired kinetics of moisture adsorption inside a given device (instrument being attained by selecting an appropriate ratio of suspension components. As compared to the known dehumidifying agents in the form of tablets or thickened silicone oil-based mixtures, the present dehumidifying composition in the form of a film or coat occupies a very small volume inside casings and has an insignificant weight. Said beneficial characteristics of the present dehumidifying composition make it eminently suited for use in conjunction with microminiaturized electronic instruments. The dehumidifying composition contained in an instrument casing (bulb) can be repeatedly regenerated, thereby making it practicable to have a requisite stock of dehumidifier-coated casings, a further advantage of the present dehumidifier being the absence of oil on the surfaces to be welded and, hence, the ease of sealing hermetically the devices or instruments.

The present dehumidifying composition is employed without resorting to mechanical means for securing said composition in instrument (device) casings or to special-type equipment for introducing said composition into instrument (device) casings and is suitable for being introduced into casings (bulbs) of any shape or size at one and the same production section, the latter feature being highly advantageous for the simultaneous production of diverse types of semiconductor instruments. It is expedient to use the present dehumidifying composition irrespective of the scale or automation degree of production processes or when the manufacture of instrument casings and the assembly of finished semiconductor devices are carried out at different plants.

It follows from the foregoing that the present dehumidifying composition used in the form of a film or coat is commercially superior to the known dehumidifiers.

The following examples are illustrative of the manner of carrying out the invention but are not intended to limit the scope thereof.

EXAMPLE 1.

One hundred parts by weight of Type Na zeolite A (moisture content, 25 percent by weight; particle diameter, 4 mc maximum) is mixed with 100 parts by weight of epoxide resin (molecular weight, 370–450; epoxy group content, 18 percent) dissolved in 127 parts by weight of an organic solvent having the following composition, percent by weight: butyl acetate, 10; cellosolve ($C_2H_5$—$OCH_2CH_2OH$), 8; acetone, 7; butanol, 15; ethanol, 10, and toluene, 50. Dubutyl phthalate (plasticizer) is added to the stirred mixture in an amount of 5 parts by weight, followed by introducing 10 parts by weight of polyethylene polyamine (curing agent). The resulting mixture is thoroughly mixed to obtain a homogeneous suspension. The dehumidifying composition thus prepared is ready for use.

Use is made of a buret, an atomizer or a syringe to apply the composition on the inner surface of instrument metal casings (bulbs) having a volume of 0.25 $cm^3$. From 10 to 12 mg of said composition is introduced in each bulb, followed by maintaining the bulbs with said composition applied thereonto for a period of 10–20 hours in the air at ambient temperature in order to remove the bulk of volatile components. Next the bulbs are placed in a vacuum drying cabinet, subjected to gradual heating to a temperature of 180° C at a residual pressure of 0.1 mm Hg, and maintained at this temperature for a period of 3 hours. It is pertinent to gradually heat the composition in order to provide in the resultant film an access of zeolite micropores to the ambient atmosphere and to attain good adhesion of the film to the bulb surface. The resultant film displays heat stability up to a temperature of 200°C in the air. The thus-treated bulbs are ready for use as sealing components of instruments or circuits.

Mechanical tests of the film under the conditions prescribed for testing transistors enclosed in bulbs are indicative of the absence of crumbling, dusting or cracking phenomena.

The film obtained by the procedure described hereinbefore is capable of maintaining in the hermetically sealed volume of the bulb a low relative humidity in the temperature range of from −60° to +150°C.

The kinetics of water vapor adsorption inherent in said film makes it possible to keep the bulbs with the film applied on the inner surface thereof for a period of 1 hour under humid microclimatic conditions (dew point, 30°C). Thanks to a relatively low rate of water vapor adsorption by the film, the bulbs may be brought in contact with the ambient atmosphere for a period of 1–2 minutes.

In case the period of time between film application and the use of thus-treated bulbs for instrument sealing exceeded one hour, said bulbs, prior to use, should be maintained at a temperature of 160°–180°C and under a vacuum of at least 0.1 mm Hg for 3 hours. This procedure results in film regeneration and the total restoration of moisture absorbing properties of the film irrespective of the time of film contact with atmosphere.

If the bulbs with a film applied thereonto are stored in sealed ampoules, film regeneration can be dispensed with and the shelf life of said bulbs under these conditions is quite long.

The results of testing various devices enclosed in bulbs coated on the inside with films of the present dehumidifying composition are as follows.

The transistors display steady parameters such as, for example, steady back currents and amplification factors, the parameters remaining constant after any period of maintaining the instruments in question at a temperature of 110°–120°C. The instruments withstood the most rigorous mechanical tests, prolonged vibration and repeated impact tests inclusive.

Said bulbs were likewise employed for sealing super-high frequency planar silicon transistors, and the presence of the dehumidifying composition provided for enhanced parameter stability during instrument service under the conditions of sharp temperature variations in the range of from −60° to +180°C, the amplification factor and back currents being exemplary steady parameters.

Where the proportions of the present dehumidifying composition components are varied so that the composition contains a lower proportion of epoxide resin and a higher proportion of zeolite, the resultant film exhibits, in contrast to the film described herein before, an essentially higher rate of water vapor adsorption.

EXAMPLE 2.

One hundred parts by weight of Type Na zeolite A (moisture content, 25 wt. percent; particle size, 4 mc maximum) is mixed with 150 parts by weight of resol-type phenol-formaldehyde resin (in combination with polyvinyl butyral) dissolved in 125 parts by weight of the solvent disclosed in Example 1. The components are mixed until a homogeneous suspension is obtained. The resultant suspension is ready for use.

The dehumidifying composition film is prepared by following the procedure of Example 1.

Relevant tests have shown that the film is capable of providing a low relative humidity in a closed volume of a bulb. The instruments sealed with bulbs furnished with the film prepared as described above display parameter stability and enhanced performance reliability at temperature of up to 120°C. However, the film exhibits a somewhat inferior elasticity and suffers from slight crumbling and dusting when transistor devices are subjected to mechanical tests such as, for example, vibration tests and repeated impact tests.

Hence, the dehumidifying composition based on phenol-formaldehyde resin in combination with polyvinyl butyral is noted for its good moisture absorbing properties and may be used to advantage in instruments and devices operated in the absence of significant mechanical loads.

EXAMPLE 3

One hundred parts by weight of Type Na zeolite A (moisture content, 25 wt. percent; particle diameter, 4 mc maximum) is mixed with a binder consisting of 250 parts by weight of 60 percent resol-type phenol-formaldehyde resin, 50 parts by weight of a solution of epoxide resin in methyl ethyl ketone, and 10 parts by weight of hexamethylenetetramine. The mixture components are thoroughly mixed in the organic solvent disclosed in Example 1 until a homogeneous suspension is obtained.

The film prepared from said dehumidifying composition and the instruments sealed with a bulb coated with said film have the properties identical to those of the film and instruments disclosed in Example 1, respectively.

We claim:

1. A dehumidifying composition for dehydration of hermetically sealed containers which consist of a zeolite and a thermosetting polymer capable of forming a cohesive bond with the zeolite and an adhesive bond with the material of said containers, the content of zeolite in said composition being from 20 to 60 wt. percent and the content of said polymer being from 40 to 80 wt. percent, and said composition has a significant portion of the volume of its secondary pores due to pores in the equivalent radius range of from 98 to 31 A.

2. A dehumidifying composition according to claim 1, wherein the thermosetting polymer is cured epoxide resin.

3. A dehumifidying composition according to claim 1, wherein the thermosetting polymer is cured phenol-formaldehyde resin.

4. A dehumidifying composition according to claim 1, wherein the thermosetting polymer is a cured mixture of epoxide resin and phenol-formaldehyde resin.

5. A dehumidifying composition according to claim 1, which comprises 40 wt. percent of Type Na zeolite A and 60 wt. percent of cured and plasticized epoxide resin containing 18 percent of epoxy groups.

6. A method of preparing a dehumidifying composition in the form of a film or coat intended for dehydration of hermetically sealed containers of various shape and capacity, small-capacity containers inclusive, which comprises applying onto a part of the inner surface of said containers a suspension containing 100 parts by weight of zeolite, 45–280 parts by weight of thermosetting resin, 120 parts by weight of a solvent capable of dissolving said resin, 0–45 parts by weight of a suitable plasticizer, and 0–85 parts by weight of a suitable curing agent; maintaining the applied suspension at a temperature of from 15° to 80°C in order to remove the bulk of volatile components, and thereafter subjecting said suspension to heat treatment at a temperature of from 150° to 180°C in vacuo under a residual pressure of $10^{-1}$ mm Hg maximum, said heat treatment resulting in the removal of the last traces of said solvent and in the formation of a microporous film which adhesively coats said surface of said containers and exhibits the requisite kinetics of water vapor adsorption.

7. An enclosure for providing a moisture-free environment comprising a container for said environment, having at least some portion of its inner surface coated with a film of the desiccant composition of claim 1.

8. A hemetically sealable container for providing a moisture free environment for enclosing moisture sensitive equipment having at least some portion of its inner surface coated with a film of the dehumidifying composition of claim 1.

* * * * *